Nov. 3, 1925.  
C. GITZENDANNER  
STRUT ROD  
Filed Feb. 21, 1922  
1,560,051  
3 Sheets-Sheet 2
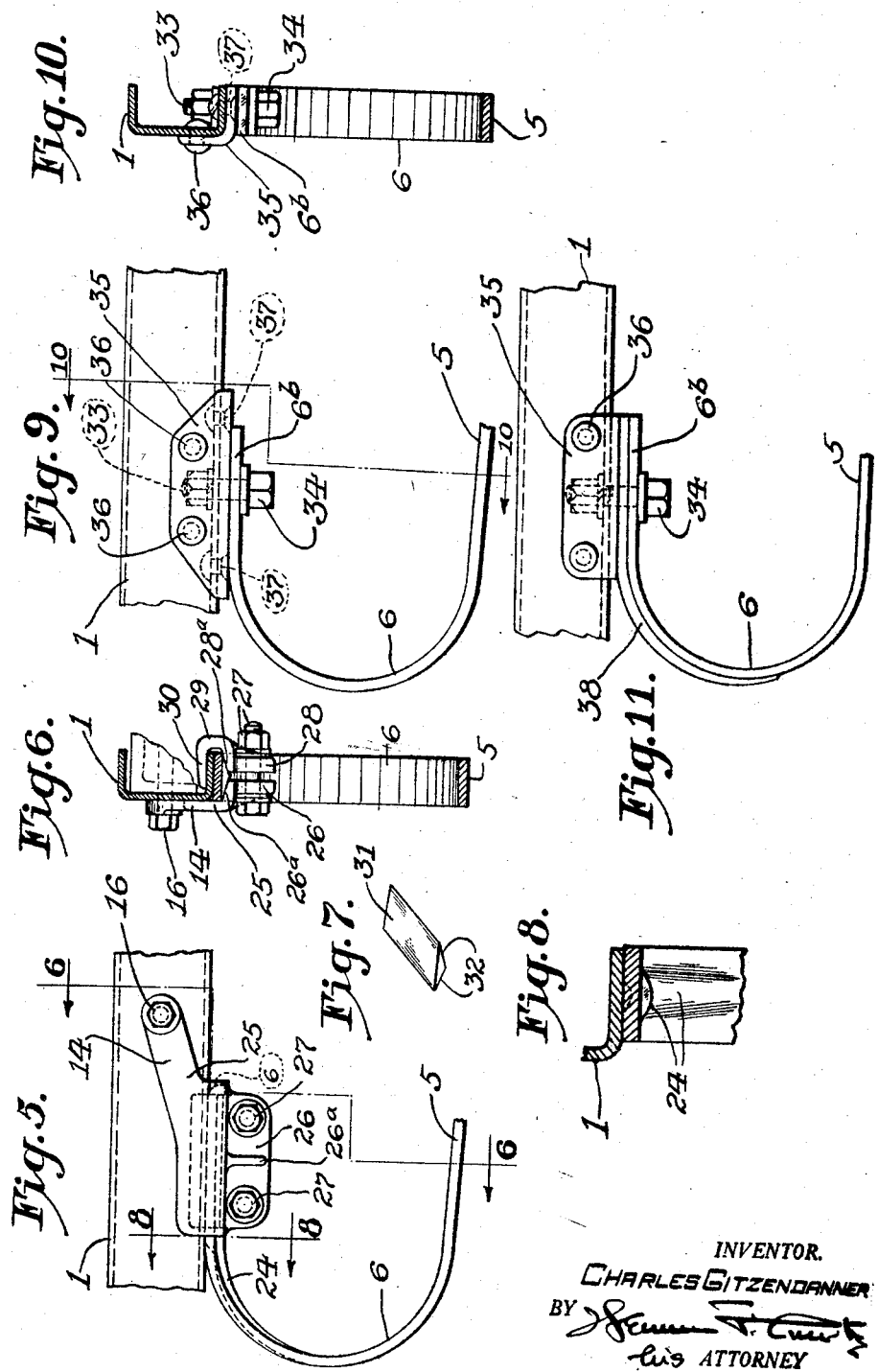
INVENTOR.  
CHARLES GITZENDANNER  
BY  
his ATTORNEY

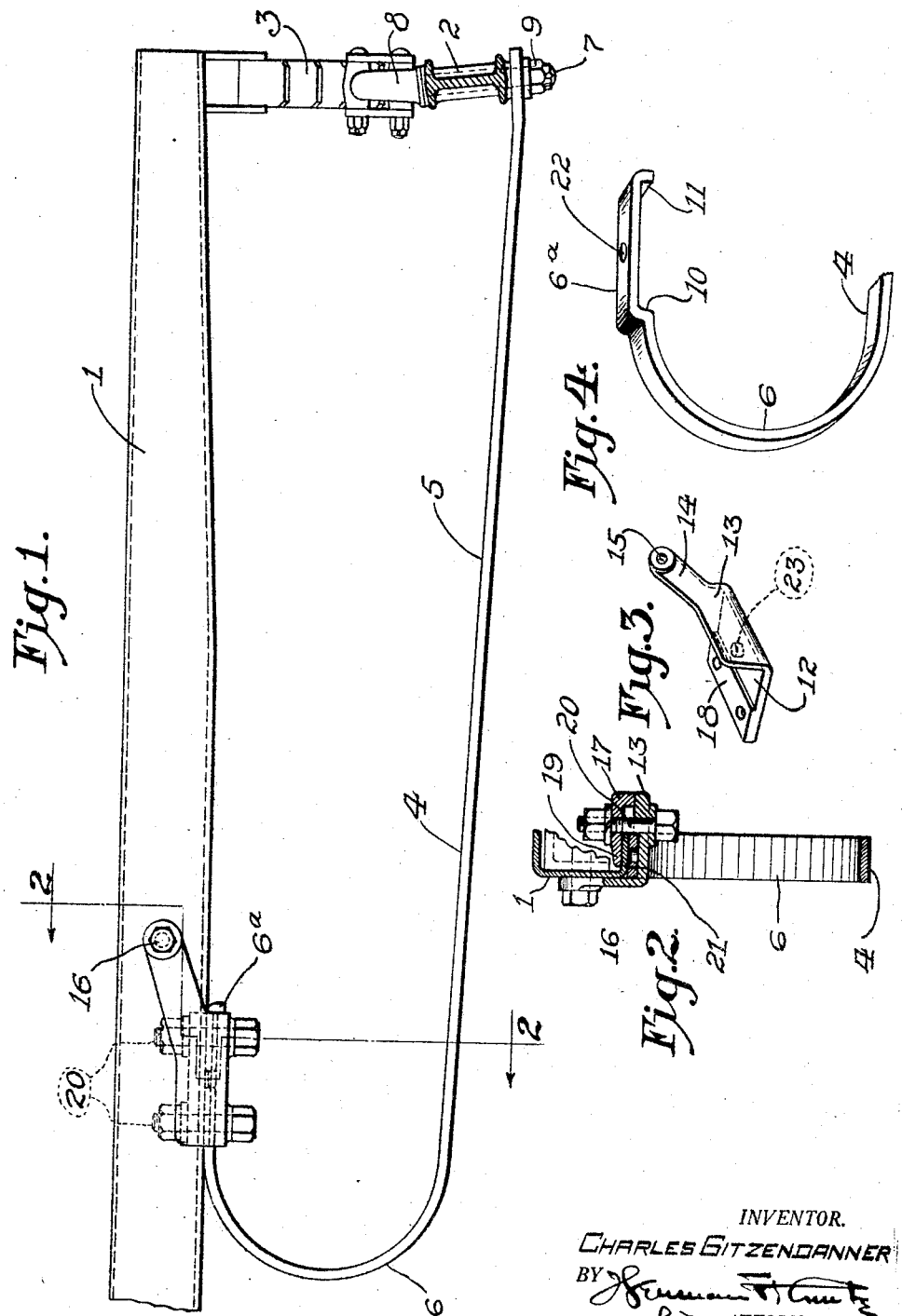

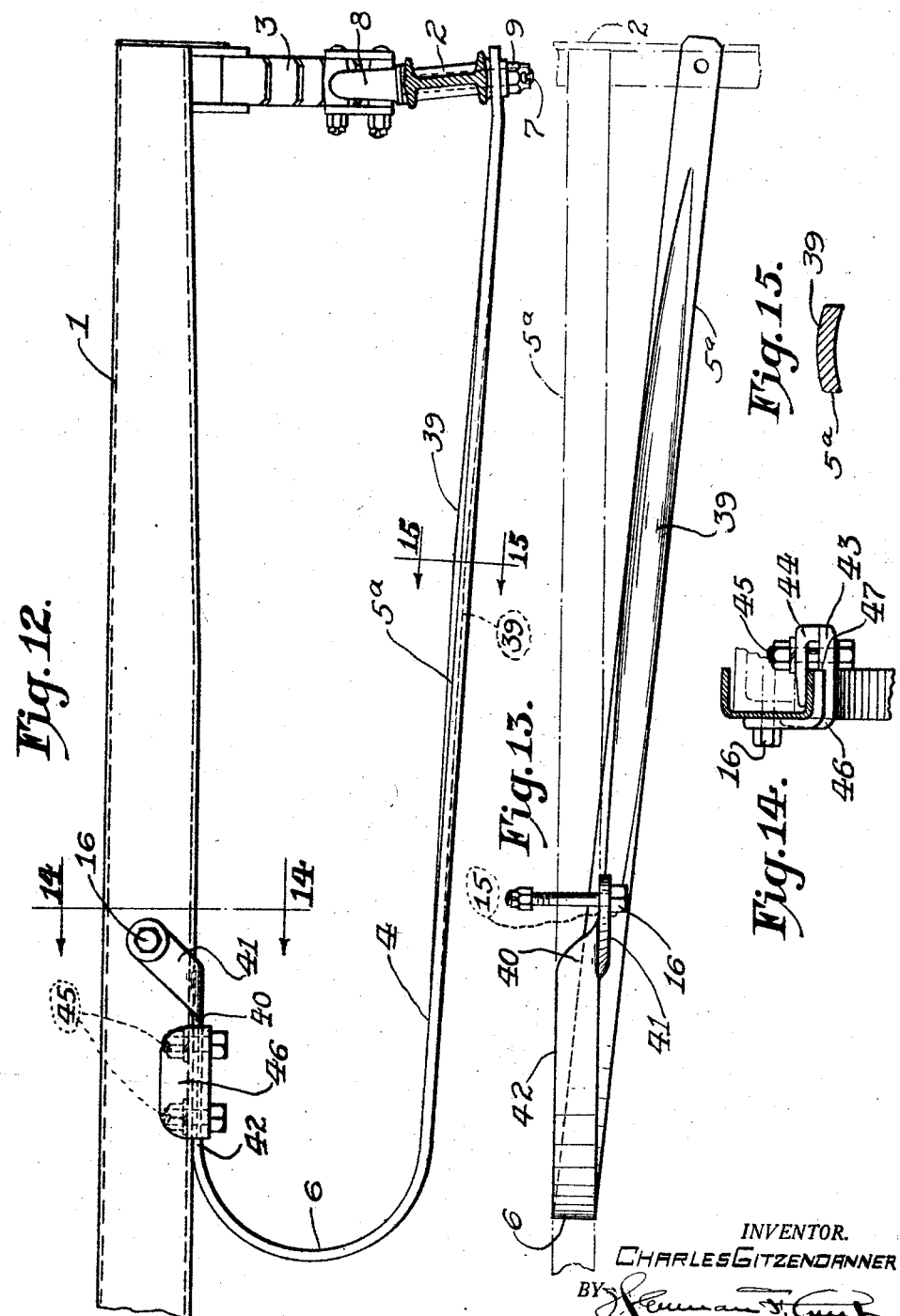

Patented Nov. 3, 1925.

1,560,051

UNITED STATES PATENT OFFICE.

CHARLES GITZENDANNER, OF BROOKLYN, NEW YORK.

STRUT ROD.

Application filed February 21, 1922. Serial No. 538,311.

*To all whom it may concern:*

Be it known that I, CHARLES GITZEN-DANNER, a citizen of the United States, residing in the borough of Brooklyn, Ridgewood, county of Queens, and State of New York, have invented certain new and useful Improvements in Strut Rods, of which the following is a specification, reference being had to the accompanying drawings, illustrative of one particular embodiment of my invention.

This invention relates to vehicles, and more particularly the part of a power driven vehicle which serves the purpose of maintaining a predetermined position of an axle in a plane transverse to the frame of the vehicle while still permitting the vertical spring yielding of the axle with relation to the frame of the vehicle.

Among the objects are to provide means whereby the relative position of axle and vehicle frame are securely held in desired relation, namely, to keep the axle substantially at right angles to the longitudinal axis of the vehicle but still permitting all necessary freedom of vertical movement of the axle, and to accomplish this with rigid attachment to prevent rattling, to supply a structure of simplicity and low cost of manufacture, that will be of ample strength and light weight to resist the required strains, and in particular to absorb horizontal shocks in the direction of the movement of the vehicle. In the case of power vehicles in which the structure is primarily applicable, the vehicle body and frame are usually propelled through their connections with the rear or driving wheels, and in turn the connection from the frame or body to the front axle carries the strain from driving or moving front axle with the power-propelled other parts of the vehicle.

The means for accomplishing this usually referred to as a strut or strut rod is of a type differing from what has heretofore been known as a radius rod or rigid strut bar, and embodies the broad characteristics set forth in my prior United States Letters Patent No. 1,360,925, granted November 30, 1920, and the form of invention herein referred to involves modifications and changes in the structure specifically shown and described in said patent as will hereinafter appear from the detailed specification and from the accompanying drawings, in which:

Fig. 1 is a side elevation of the forward end of a vehicle frame with the strut rod attached to frame and axle.

Fig. 2 is a vertical offset section on the line 2—2 of Fig. 1.

Fig. 3 is a perspective view of the bracket for attaching the main strut member to the frame.

Fig. 4 is a perspective of the curved or shock-absorbing end of the main strut member.

Fig. 5 is a fragmentary view, in elevation, of the shock-cushioning end of the strut rod and adjacent frame portion and attaching means, in slightly modified form.

Fig. 6 is a cross-section on line 6—6 of Fig. 5.

Fig. 7 is a perspective of the wedge member associated with the securing bracket in preceding two figures.

Fig. 8 is a cross-section on the line 8—8 of Fig. 5.

Fig. 9 is a modified form of the strut rod and frame attaching means.

Fig. 10 is an end view of Fig. 9 on section 10—10.

Fig. 11 is a side elevation, fragmentary view of frame and strut rod main member shock-cushioning end in slightly modified form.

Fig. 12 is a side elevation of the forward end of a vehicle frame with strut rod of slightly modified form attached to the frame and front axle.

Fig. 13 is a top view of the modified strut rod shown in Fig. 12.

Fig. 14 is a cross-section on the line 14—14 of Fig. 12.

Fig. 15 is a cross-section on the line 15—15 of Fig. 12.

The main frame member 1 is one side sill of a pair constituting the forward end of an automobile frame which is supported to carry the load of the forward end, upon an axle 2 by a spring such as 3, which permits vertical relative movement substantially in the plane transverse to the longitudinal axis of the vehicle, but which does not provide the support for horizontal strain or shock in the direction of movement of the vehicle which exists when the frame member 1 is propelled through means such as the usual rear driving wheels and their connections, and with any resistance or engagement with obstacles by the front wheels supported by the axle 2. To provide this horizontal support and still accommodate the necessary yield for the load spring action, and to absorb the horizontal shocks to which the front axle is subjected in co-operation with the frame, the strut rod 4 is attached to the front axle 2 and at its other end to the frame 1, and embodies the main straight section 5 and an integral curved section 6, which conjointly permit vertical movement of the strut 4 and a shock or strain-absorbing section in the curved portion 6.

As shown in Figs. 1 to 4, the front end of strut 4 is secured by the engagement with the shank 7 of a spring perch 8 and held rigidly by the nut 9. The other end of the strut is crimped at 10 and 11 and engages a seat 12 on a bracket 13 which has an arm 14 with a bolt hole 15 for engagement with a bolt 16 passing through a hole in the centre of the web of the vehicle frame sill. A clamp 17 engages a seat 18 on the bracket 13 with its lip 19 engaging the upper side of the lower flange of the vehicle frame, with two bolts 20—20 passing through the clamp 17 and the bracket 13, thereby serving to draw the bracket and clamp tightly together and between them the end 6ᵃ of the strut rod and the lower flange 21 of the frame or sill, so that tightening up the bolts 20, 20 serves to rigidly secure the end of the strut rod to the channel section frame. While the offsets 10 and 11 in this end of the strut rod engage either end of the bracket 13, as an alternative, or in addition, a hole 22 may be provided in the end 6ᵃ of the strut and a stud 23 formed in the seat or attached in the seat on the bracket 13, provide a definite engaging and horizontally locking means to prevent any slipping or movement of this end of the strut with respect to the frame attaching means.

As shown in Figs. 5 to 8, the strut end 6 has a crimp 24 tapering from the point of attachment to the frame gradually through the curved portion so as to stiffen this shock-absorbing curved section and distribute the flexing of the spring and avoid concentration of strains at the point of rigid attachment. In these views the bracket 25 is of slightly modified form having a depending flange 26 with the arm 14, and bolts 27—27 passing through the flange 26, which preferably has a stiffening rib 26ᵃ, while a complementary flange 28 is positioned to receive the bolts 27 and forms part of a clamp 29 having a lip 30 engaging the top side of the lower flange of frame 1. Above the flanges 26—28 is provided a wedge 31 with tapered faces 32 engaging tapered seats 26ᵃ and 28ᵃ, while the upper side of the wedge engages the bottom face of the end of the strut rod member. It will thus be seen that the tightening of the bolts 27 draws the clamp 29 into tight engagement with the flange of the sill 1, and on account of the wedge 31, the tightening reaction draws the lip 30 of the clamp and the end of the strut member and the wedge tightly together to provide a rigid securing means of the strut at the frame 1.

In Fig. 9 the strut end 6 has its end 6ᵇ perforated and a bolt 33 passes through the perforation with the head 34 in an accessible position for tightening, while a reinforcing angle plate 35 is secured by rivets 36 to the web and by rivets 37—37 to the flange of the channel iron, thereby providing a strengthening of the frame sill to offset any reduction in strength, caused by the hole pierced through the lower frame web. If desired this strengthening plate may be attached at the inside of the web and flange of the sill and thereby form a stiffening against vertical strains which might tend to cause an upward bending of the lower flange, though I prefer the strengthening plate on the outside, and thereby at a greater distance from the axis of the channel frame, providing with a like weight of plate a greater strength. In this form the plate supplants the bracket and the positioning arm 14 and the other parts of clamp and bracket which otherwise would be required to form a secure attaching means, and affords means for strengthening the frame at this point of attachment of the strut rod.

As shown in Fig. 11, the bracket 35 with rivets 36 is of slightly modified form and is held in position by attachment to the web without perforating the lower flange with rivet holes; and the strut end 6ᵇ has a complementary short spring leaf 38 preferably formed of slightly lesser curvature than the outer surface of the curved portion 6 of the strut, and with a taper, whereby the leaf 38 serves to distribute the bending strains imposed upon portion 6 of the strut due to shocks or horizontal blows and vibration in direction of axis of the strut, and to gradually absorb any flexing and distribute the slight bending involved in the action of this curved portion 6 of the strut.

As shown in Figs. 12 to 15, the strut portion 5ᵃ has a crimp 39 with a maximum offset about its middle and tapering in either direction so that a predetermined portion, preferably at the middle of the straight section of the strut, is stiffened in order to resist strains which might horizontally deflect it. The curved section 6 of the strut is provided at its end with an offset 40 and an up-turned ear 41 having a hole 15 to accommodate the bolt 16, which in other forms cooperates with the arm of a separate bracket. The portion 42 near the end of the strut bar is formed straight and flat to engage the lower surface of the frame sill flange and a two-part clamp prevents sidewise movement by the parts 43 engaging the underside of the portion 42 of the strut while the complementary section 44 of the clamp with its heel and toe serve, in conjunction with the bolts 45, to draw the clamps together and hold the portion 42 of the strut in cooperation with an ear 46 of the lower clamp portion 43 and a shoulder 47 engaging the other edge of the portion 42 of the strut.

As shown in Fig. 13, in this type of strut rod the end which attaches to the frame is offset at a slight angle from the plane in which the straight portion 5 is located, because the two points of attachment at the front axle of the forward end of the straight portion of the struts are further apart than the distance between the portions of the sill of the frame where the other ends of the two struts are secured. By the clamping of the sill ends securely, when the rear bent portion has been given the correct offset, the form of brackets or attaching means which prevent twisting, aid in aligning the struts upon installation and give some resistance against lateral displacement of the front axle, thereby tending to preserve the alignment of the front axle within limits of the natural yield of the spring strut.

In the use of my spring strut bar, the light weight is obtained by the use of properly heat-treated steel, so made that the spring in the strut provides for the longitudinal thrust strains on the straight portion, and provides for the cushioning of shock strains in the curved portion. In some cases the drawing of the temper can be so accomplished as to vary in the two main portions, so that the curved portion will be more durable and lasting in its constant flexing with shock vibration and the straight portion will have heat-treatment characteristics to most effectually resist the constant vertical movement of the front end as well as the slight twist which is due to one end of the front axle rising relatively more than the other. With the flat springs properly curved and with other ends properly formed for attachment, it will be seen that a member such as a strut rod, constituting a very essential element in a car, is constantly flexing and must still resist at its ends the strains due to vibration, shock and the relative axle movement. The exacting service of such a part involves most important treatment of the method of attachment to the frame in order to assure the very advantageous service which is obtained by the use of a pair of these spring strut rods. On that account the detailed features hereinbefore described and shown in the accompanying drawings forming a part hereof, are important in many respects or may be preferable features for certain types of automobiles or for different sizes of cars.

Thus it is particularly aimed to provide such means for securing the bent end of such spring strut rods, to the frame of a vehicle without in any way impairing the strength of the section of the frame, and in certain forms specifically shown and described such is accomplished without cutting or perforating the strain-resisting flange of the vehicle frame member, whereas in a modified form where for simplicity a perforation is resorted to, a construction is provided to strengthen or compensate therefor so that such latter forms of attachment may be used when facilities for drilling and riveting or otherwise securing the splice or strengthening plate is at hand. In particular, when my improved spring strut rod is attached during the construction of the vehicle it is feasible to strengthen the sill at a point where the curved cushioning end of the strut is to be attached, and thereby simplify and effect general economy in the manufacture and embodiment of my invention and at the same time provide by a single bolt, or more if desired, means for replacement and repair in the event of accident to the vehicle when on the road or when replacement in general service is done at places where tools are not accessible.

In particular the rigid attachment, when bolting by using suitable lock washers or lock nuts, is a primary feature in the embodiment of my spring strut rod at the point of attachment of the curved cushioning section of the strut to the frame, with the object of resisting the constant strain in service and to prevent loosening and any derangement which would transfer the flexing strains of the strut rod portions or displace such strains in a manner that might affect the proper functioning of the strut.

While various modifications may be made in the particular forms herein shown and described, without departing from my invention, what I claim and desire to secure by Letters Patent is:

1. In an automobile, front axle and two longitudinal sills spring mounted thereon, two strut rods rigidly secured to the axle each having a rearwardly extending straight portion and an integral reversed curved rear spring portion, the rear end terminating in a flat horizontal portion lying against the surface of the underside of the sill and having an extended bearing thereon, and means to rigidly clamp said rear end to the under side of the sill.

2. Strut rods of the character described in combination in an automobile, two sills having extended flat under surfaces, a reinforcement rigidly secured to an extended portion of the lower member and on the lower surface of each sill in position to be secured and presenting an extended bearing for the return curved end of each strut rod whereby a long bearing substantially in the vertical plane of the sill is provided with a rigid means of attachment at the strut end under said reinforced sill substantially in said plane.

3. Strut rods in combination with an automobile front axle and side sills having an integral member of the character described rigidly held at one end to the axle and at the other end having a return curved spring portion with a nesting short spring leaf and means for rigidly clamping said spring end and leaf to an extended bearing on the under side of the sill at a reinforcement riveted thereto.

4. A strut rod of the character described comprising a means of attachment to the sill of the automobile including an extended bearing at the spring end of the strut in direct engagement and substantially in the vertical plane of the sill of the automobile, and a single bolt clamping the strut end and lower sill surface together.

5. A strut rod of the character described with a long straight portion and an integral curved spring portion terminating in an extended bearing portion, a tapering crimp in the straight portion of the strut providing a rigid strut for a major extent of the straight portion, said crimp merging into the flat spring portion of the curved section and the rigidly connected axle end and the adjacent flat spring portion of the strut between the crimp and the axle.

In testimony whereof, I have signed my name to this application, this 18th day of February, 1922.

CHARLES GITZENDANNER.